United States Patent
Bejach

[11] 3,718,846
[45] Feb. 27, 1973

[54] VARIABLE SPEED PLURAL MOTOR CONTROL SYSTEM WITH INCREMENTAL SPEED SYNCHRONIZATION

[75] Inventor: Benton Bejach, Santa Ana, Calif.

[73] Assignee: Borg-Warner Corporation, Chicago, Ill.

[22] Filed: April 13, 1971

[21] Appl. No.: 133,650

[52] U.S. Cl. .................................. 318/85, 318/78
[51] Int. Cl. ............................................ H02p 5/46
[58] Field of Search .......... 318/71, 73, 74, 77, 78, 85

[56] References Cited

UNITED STATES PATENTS

| | | | |
|---|---|---|---|
| 3,118,097 | 1/1964 | Hettler | 318/77 X |
| 3,064,173 | 11/1962 | Breen et al. | 318/77 X |
| 3,549,948 | 12/1970 | Jaeschke | 318/85 X |
| 3,600,655 | 8/1971 | Karlin | 318/78 X |

Primary Examiner—T. E. Lynch
Attorney—Donald W. Banner, William S. McCurry and James J. Jennings, Jr.

[57] ABSTRACT

A system for controlling the speed and synchronization of two a-c motors comprises a master vco (volt-age-controlled oscillator) for providing timing pulses to drive the master inverter which energizes the first a-c motor. A system speed control pot provides a speed set signal to the master vco, and also to a slave vco which controls the slave inverter that energizes the second a-c motor. A phase detector receives first and second low-frequency input signals from the loads driven by the motors. A count-up register receives high-frequency pulse signals from the master vco and, through a dac (digital-to-analog converter), provides a positive-going ramp signal which has its reset portion determined by an output signal from the phase detector. A count-down register receives high-frequency pulse signals from the slave vco and, through another dac, provides a negative-going ramp signal which has its reset portion determined by a second reset signal from the phase detector. These opposite-slope ramp signals are summed with a signal from the phase detector to provide a d-c control signal which is used as a second input signal to the slave vco, thus maintaining motor synchronization. An out-of-sync signal overrides the d-c control signal and provides a modified d-c signal to the slave vco to drive the second motor toward synchronization. The d-c control signal can also be modified by a position control signal, to provide an incremental position variation of the second a-c motor without disturbing the synchronized speed relationship of the two motors.

13 Claims, 14 Drawing Figures

FIG.1

Inventor
Benton Bejach

VARIABLE SPEED PLURAL MOTOR CONTROL SYSTEM WITH INCREMENTAL SPEED SYNCHRONIZATION

BACKGROUND OF THE INVENTION

In the motor control art different systems have been developed and then improved in an effort to achieve not only good speed regulation but also synchronization between the operating speeds of two or more electrical motors. Much of this effort has been expended on systems which use a-c motors, because they are generally simpler, more rugged and less expensive than d-c motors. One control system for synchronizing two motors utilizes tachometers or other devices to provide signals indicating the actual rotation speeds of the motors, or the speeds of the loads driven by the motor. A phase detector circuit is frequently employed to compare the two speed-indicating signals, and thus indicate any speed (or synchronization) difference by a change in the output signal of the phase detector. Such a system is helpful to achieve the same operating speeds — or to maintain synchronization by maintaining the desired ratio of operating speeds between two motors — but has not achieved the high degree of precision necessary in many precise manufacturing operations.

It is therefore a primary object of this invention to provide such a speed control system which not only can maintain two motors operating at the same speed or at synchronized speeds, but can also insure precise in-phase operation to maintain an exact physical correlation between the driven loads.

Another important object of this invention is to provide such a system which can also produce a slight phase displacement in one motor control signal to produce a corresponding slight physical displacement of one of the motors, to adjust or change the relative positions of the driven loads without losing the synchronized speed operation between the two a-c motors.

SUMMARY OF THE INVENTION

A variable speed motor control system drives a first a-c motor from a first inverter which receives timing pulses from a master source, such as a vco (voltage-controlled oscillator). A system speed control unit, such as a potentiometer, is connected to regulate the rate at which the timing pulses issue from the master source. A second a-c motor is energized from a second inverter which receives timing pulses from a slave source.

Particularly in accordance with this invention, a phase-lock and position control subsystem is provided. This subsystem includes means for applying a signal from the system speed control unit to the slave source of timing pulses. A phase detector is included, and is connected to receive both a first series of position-indicating signals which varies as a function of movement of the first a-c motor, and a second series of position-indicating signals which varies as a function of movement of the second a-c motor. A first register-and-dac is connected to receive an input signal from the master source, and to provide a first ramp signal having a slope of given polarity. The reset portion of this first ramp signal is determined by a first reset signal from the phase detector. A second register-and-dac is connected to receive an input signal from the slave source, and to provide a second ramp signal which has a slope with a polarity opposite that of the first ramp signal. The second ramp signal is displaced in phase relative to the first ramp signal, and the reset portion of the second ramp signal is determined by a second reset signal from the phase detector. A summing means is provided for combining the ramp signals with the phase detector signal to provide a d-c control signal at a summation point, and this d-c control signal is applied to the slave source of timing pulses. With this system synchronized operation between the first and second a-c motor is achieved and maintained.

In accordance with another aspect of this invention, the subsystem may include a position control unit for the second (or slave) a-c motor. The position control unit can be a potentiometer coupled to the summing means for combining the ramp signals. Adjustment of the position control pot modifies the d-c control signal and produces an incremental position displacement of the second a-c motor with respect to the first. This is accomplished without disturbing the syn-chronized operation between the two motors.

THE DRAWINGS

In the several figures of the drawings, like reference numerals identify like components, and in the drawings.

GENERAL SYSTEM DESCRIPTION

Figure 1:
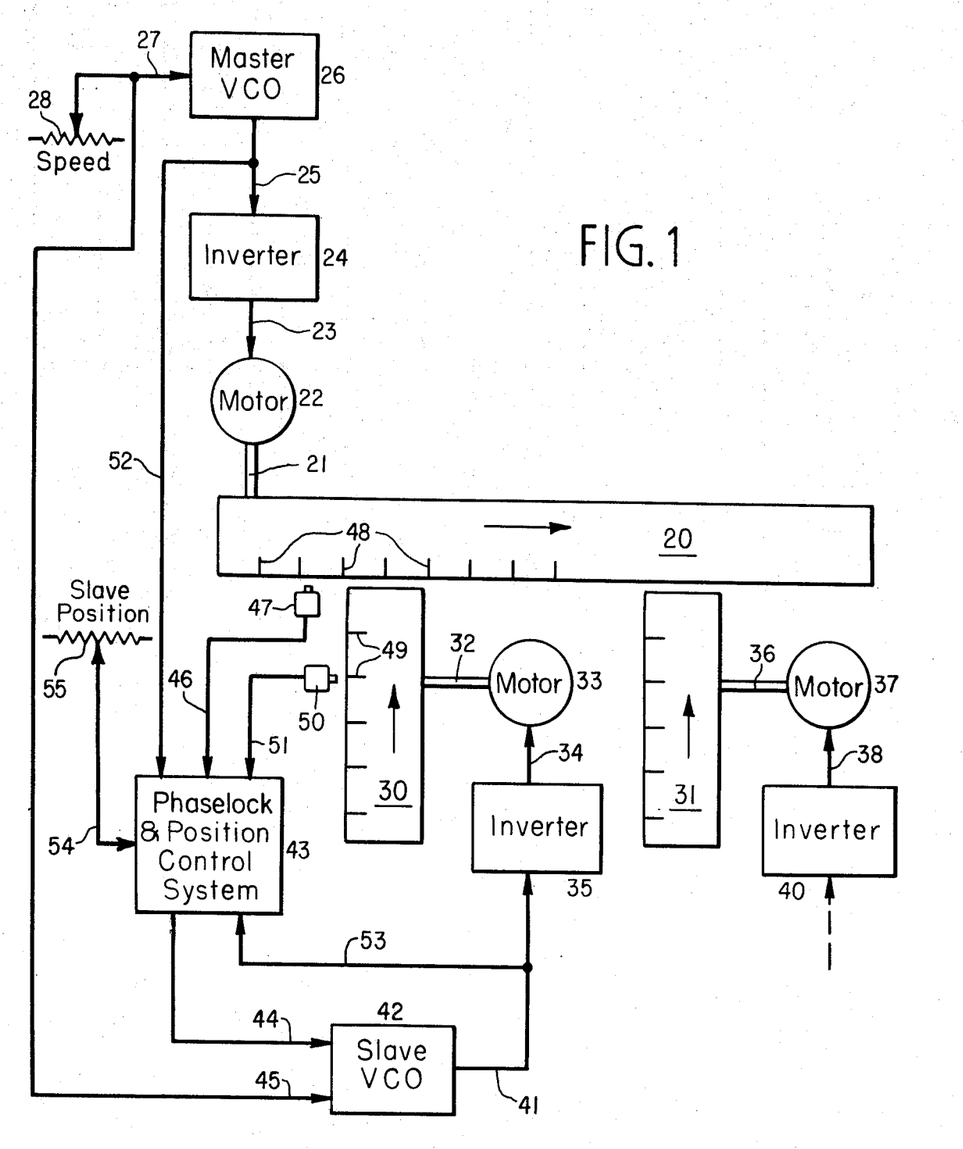
FIG. 1 is a general equipment layout showing the addition of this invention to previously used components of a motor speed control system.

FIG. 1 depicts a general material transport arrangement in which a reference conveyor belt 20 is driven over a mechanical coupling 21 from a first a-c motor 22. In turn the a-c motor is energized over line 23 by the a-c voltage output from a first inverter 24. The frequency of inverter operation is determined by timing pulses received over line 25 from a master source of timing pulses, depicted with the general legend of a voltage controlled oscillator (vco). The rate at which these timing pulses issue from vco 26 is determined by a speed set signal received over line 27 from a system speed control unit 28. This unit can be a potentiometer, as shown, or any other suitable means of providing an adjustable d-c voltage to effect a variation in the frequency of the pulses provided by master vco 26. Thus the setting of speed pot 28 regulates the rotational speed of motor 22, and thus governs the rate of linear displacement of conveyor belt 20.

For purposes of explaining the invention it is assumed that subassembly conveyor belts 30 and 31 are arranged at right angles to the main belt 20, to feed material or parts toward (and perhaps onto) main belt 20 at a rate which should be precisely synchronized with the speed of the main belt 20. Precise synchronization, as used in this specification and the appended claims, does not mean only an exact 1:1 correspondence between the speeds of the conveyor belts or their driving motors. It may be that the subassembly conveyor 30 carries units to be assembled in a manner such that four units from belt 20 are to be attached directly to a single component passing on main conveyor 20. In this case the auxiliary belt 30 would be driven four times as fast as main conveyor belt 20. Thus the term "synchronization" embraces both 1:1 correspondence, and other ratios of speeds between the conveyor belts and their driving motors.

The subassembly belt 30 is driven over a mechanical linkage 32 from a second a-c motor 33, which in turn is energized over line 34 from a second or slave inverter 35. The additional subassembly conveyor 31 is similarly driven over a linkage or shaft 36 from a third a-c motor 37, which is energized over line 38 from a third inverter 40. The subsequent explanation will make it evident that additional motors and their energizing inverters can be utilized, and driven in synchronization with the master motor 22 which drives the main conveyor 20. The principles of this invention will be described in connection with the driving relationship between the master motor 22 and the slave or second motor 33.

Slave inverter 35 has the frequency of its output voltage determined by pulses received over line 41 from a first output connection of a slave vco 42. Particularly in accordance with this invention, a phaselock and position control subsystem 43 is provided. The subsystem 43 receives four different input signals and provides a single output control signal over line 44 to regulate the frequency of the slave vco, in conjunction with another signal received over line 45 from the speed pot 28 which also determines the frequency of the pulses from master vco 26. Subsystem 43 receives a first series of position-indicating signals over line 46 from a first detector 47 positioned adjacent main conveyor belt 20. The sensor 47 can be a magnetic type unit which issues an output pulse over line 46 each time one of the magnetic units 48, embedded in the conveyor belt, passes detector 47. These magnetic units 48 are spaced apart by a distance indicating a single work space, or other arbitrary interval, in accordance with the individual manufacturing specifications. A similar series of magnetic reference markers 49 are embedded along the edge of slave conveyor belt 30, so that passage of each marker 49 adjacent detector 50 provides one of a second series of position-indicating signals for application over conductor 51 to the subsystem 43. It is emphasized that although the detectors 47, 50 are shown positioned adjacent the loads driven by the respective motors 22 and 33, the detectors could also be positioned to sense rotation of the output shafts of the a-c motors before this rotational movement is translated into linear displacement. Likewise other types of sensors could be employed. Photocells can be utilized and energized as light passes from a lamp through spaced-apart timing holes near the edge of the conveyor belts to strike the photocells and provide the first and second series of position-indicating signals to denote in some way the operating speeds of the motors 22 and 33, which in this example is accomplished by sensing movement of the loads driven by these motors.

Subsystem 43 receives a third input signal over line 52 from master vco 26, a signal similar to that of the train of pulses applied to the master inverter. A fourth input signal to the subsystem is received over line 53 from slave vco 42, and this fourth signal is similar to the train of timing pulses which regulates the frequency of slave inverter 35. It is noted that these third and fourth subsystem inputs are at a high frequency, that is, high with respect to the low-frequency input signals received over lines 46 and 51. To illustrate it is assumed that master vco 26 is providing pulses on lines 25 and 52 at 360 Hertz. With a three phase inverter, utilizing two semiconductor switches in each phase, this train of pulses would be divided by six in a well known circuit (not illustrated), so that the output voltage of inverter 24 would be alternating at 60 Hertz. A four-pole motor 22 would thus be driven at 1,800 rpm, or 30 revolutions per second (rps). Another frequency reduction is generally provided in gearing (not shown) between the motor shaft 21 and the driven load 20. If this reduction of the order 20:1, then the output shaft speed is 1.5 rps. Thus the actual linear displacement of belt 20 is such that the signals from sensor 47 occur at 1.5 Hertz. The frequency of the signals on lines 46 and 51 is low when contrasted to the frequency of the vco signals on lines 52 and 53.

The fifth input signal to subsystem 43 is provided over line 54 from a position control unit, depicted as a potentiometer 55. As will become apparent from the subsequent explanation, a change in the voltage level passed over line 54 provides a slight position change at the output shaft of slave motor 33, with a consequent adjustment of the linear position of auxiliary conveyor belt 30 relative to belt 20. It is important to note that this position control to provide precise alignment of the work stations is effected without disturbing the continued synchronization between the operation of master motor 22 and slave motor 33.

DETAILED DESCRIPTION OF THE INVENTION

Figure 2:
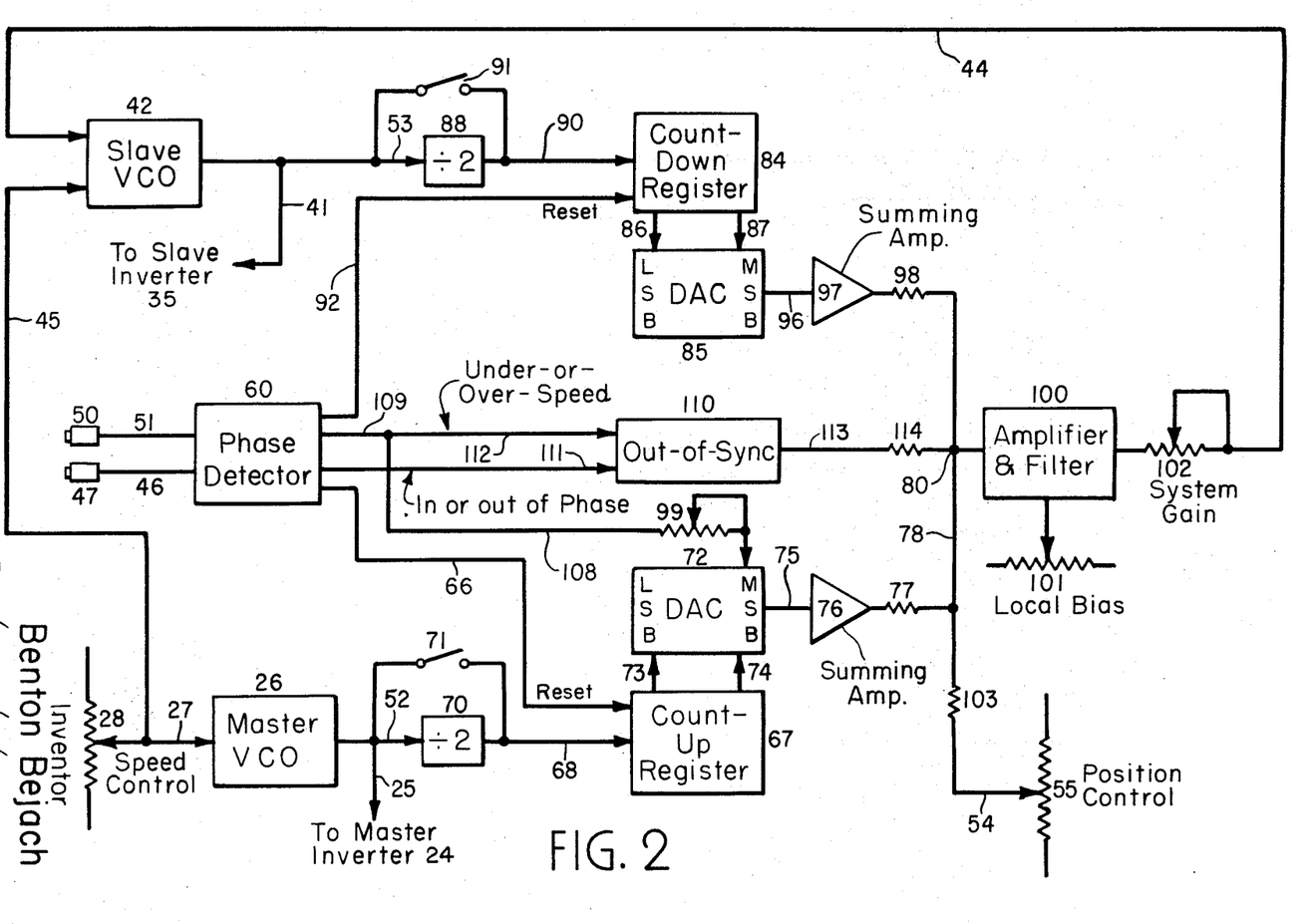
FIG. 2 is a block diagram, partly in schematic form, depicting the general system arrangement of this invention.
Figure 3:
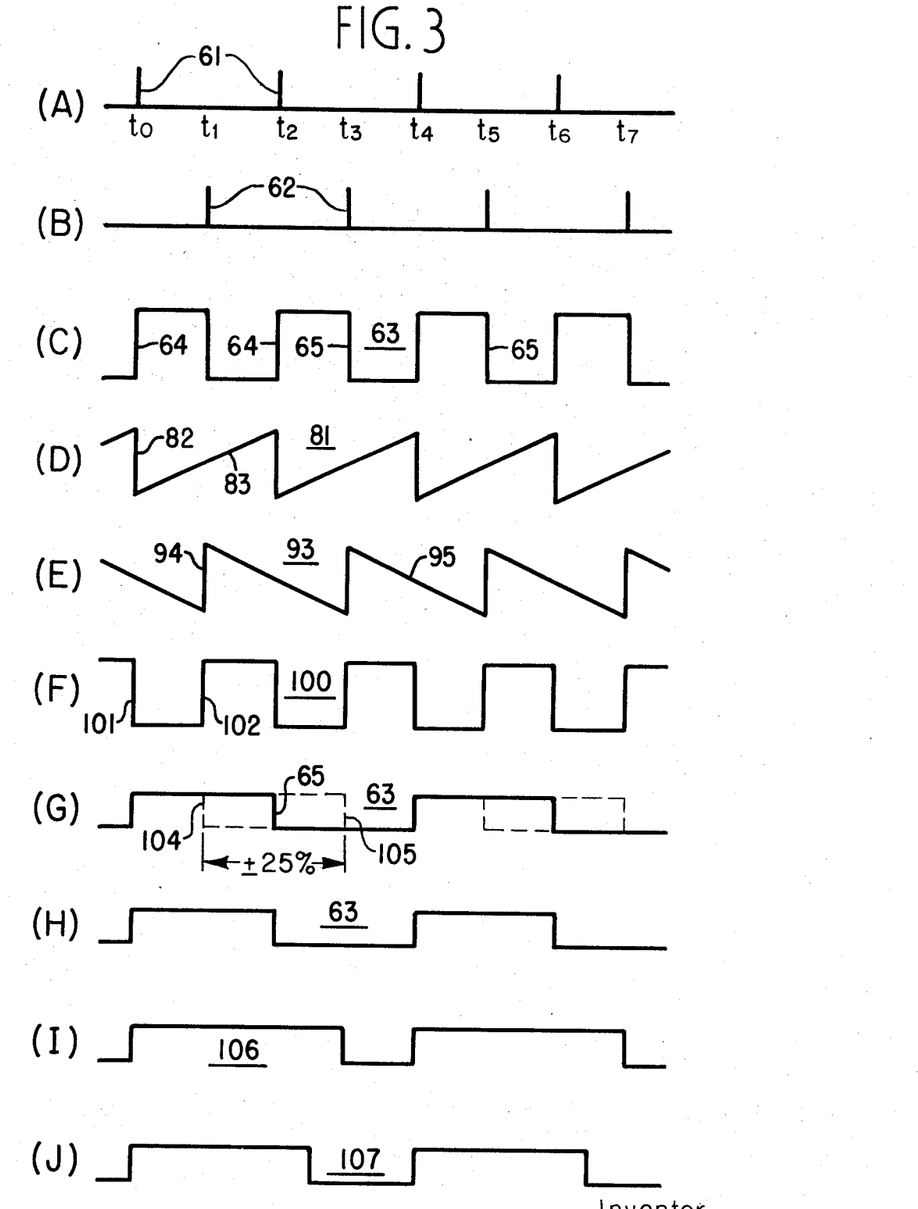
FIGS. 3A–3J are graphical representations useful in understanding operation of the system shown in FIG. 2.

FIG. 2 depicts the major components of subsystem 43, their connections with the master and slave vco's, and with the low-frequency signal detectors 47, 50. The subsystem 43 includes a phase detector 60, having two input connections for receiving the low-frequency position-indicating signals over conductors 46 and 51. It is assumed for purposes of this explanation that the system of FIG. 1 is driving the motors 22 and 33, and thus belts 20 and 30, at the same speed, and that the subsystem is maintaining a precise 1:1 synchronization between the motor speeds. Under these conditions magnetic "markers" 48 pass detector 47, and a first series of low-frequency position-indicating signals 61, as shown in FIG. 3A, is passed over line 46 to phase detector 60. These signals 61 vary as a function of movement of first motor 22, and of primary conveyor belt 20. Under in-sync conditions, detector 60 is also receiving a second series of low-frequency position-indicating signals 62 (FIG. 3B) over line 51 from detector 50. The physical position of either — or both — detectors 47 and 50 can be adjusted to provide the spacing of pulses 61 and 62 shown in FIGS. 3A and 3B when the system is in synchronization. If the auxiliary or slave conveyor 30 is driven faster than belt 20, a count-down unit (not shown) can be coupled in series with line 51 to compensate for the speed difference. For example, if belt 30 were driven twice as fast as belt 20, then such unit would pass a single output pulse over line 51 for each two pulses received from detector 50. The position-indicating signals 61, 62 govern phase detector 60 in the generation of a square-wave signal 63 as shown in FIG. 3C. The positive-going portion of each pulse, referenced 64, is determined as magnetic marker 48 passes detector 47 and signal pulse 61 is applied over line 46 to the phase detector. The term "determined" means the occurrence in time, as used in this explanation and in the appended claims. Similarly the negative-going portions 65 of the waveform 63 are determined upon each receipt of a signal over line 51 from detector 50 adjacent slave conveyor belt 30.

As each reference pulse 61 is received over line 46, conventional circuitry within the phase detector reshapes the pulse. The reshaped pulse is passed as a reset or trigger signal over line 66 to a first input connection of a first register 67. This first register or counter is termed a count-up register because, after being reset by a low-frequency sig-nal such as 61 received over line 66, the register begins to count or total the high-frequency pulses received over line 68 from the master vco 26. A divide-by-two circuit 70 is shown coupled between master vco 26 and the count-up register 67. The divide-by-two circuit 70 can be bypassed by closing switch 71. Those skilled in the art will understand the divide-by-two circuits permit the use of larger speed reduction ratios, since ratios larger than that given in the example about (360:1.5) require more count-up register capacity.

After reset, register 67 begins to accumulate the high-frequency timing pulses received over line 68. A digital-to-analog converter (dac) 72 is shown coupled over first and last lines 73, 74 to count-up register 67. Line 73 is shown at the least significant bit (lsb) end of the dac. Line 74 is adjacent the most significant bit (msb) end, and is actually coupled to the msb-1 connection. Of course there are at least eight additional connections between lines 73 and 74, but they are omitted for the sake of describing the system concept and signal flow. The actual msb connection of dac 72 is coupled over variable resistance 99, and conductors 108, 109 to phase detector 60. With this arrangement adjustment of resistor 99 regulates the weighting of the phase detector signal to match the exact high/low frequency ratio of each particular equipment installation. This high/low frequency ratio can be any real, non-integer number. Moreover the master and slave high/low frequency ratios need not be identical. The digital total accumulated in count-up register 67 is translated into an analog signal in dac 72, and this analog signal is passed over conductor 75, first summing amplifier 76, first mixing resistor 77 and conductor 78 to summation point 80. Of course the same potential or same signal which appears on conductor 78 is also present at point 80, but it is convenient to have a single reference such as "summation point" to characterize the location at which a d-c control signal will be developed to assist in regulating slave vco 42.

Another way of viewing the first register-and-dac combination 67, 72 is to consider them as a single function generator. Such a generator produces a waveform of the type referenced 81 in FIG. 3D. This first ramp signal 81 has its reset portion 82 in each cycle determined by receipt of a first reset signal over line 66 from the phase detector. The slope of first ramp signal 81 is represented by portion 83, and the amount of slope is a function of the rate at which the high-frequency timing pulses are received over line 68.

Another register-and-dac combination is provided, including a count-down register 84 and its dac 85. Lines 86 and 87 provide the lsb and msb connections between the register and the dac; the additional connections are omitted for the sake of simplifying the discussion. High-frequency timing pulses from slave vco 42 pass over line 53, divide-by-two circuit 88, and line 90 to the count-down register. A switch 91 is provided to bypass circuit 88 when required to accommodate a larger than normal speed (frequency) ratio. Register 84 also receives a reset signal over line 92 from phase detector 60. The reset signal is similar to the low-frequency position-indicating signal 62 shown in FIG. 3B. Each pulse 62 is reshaped in phase detector 60, and then passed over line 92 to the count-down register 84. The total of the high-frequency pulses received over line 90 is continuously accumulated in register 84 and converted in dac 85, to produce a second ramp signal shown as 93 in FIG. 3E. Reset portion 94 of this second ramp signal 93 is virtually coincidental in time with the slave marker pulse 62, and the sloping portion 95 of this second ramp signal has its degree of slope vary with variation of the rate at which high-frequency timing pulses are received from slave vco 42. Thus the second ramp signal 93, displaced in phase with respect to the first ramp signal 81 as shown, is passed over conductor 96, a second summing amplifier 97 and second mixing resistor 98 to summation point 80. The summing amplifiers 76, 97 and their respective mixing resistors 77, 98 can be considered as a means for combining the ramp signals to provide a d-c control signal at the summation point.

Inspection of the first and second ramp signals 81 and 93 shows that by combining these signals a square wave signal 100 (FIG. 3F) will be produced. The sloping portions of the ramp signals have opposite polarities and thus produce a virtually constant d-c voltage. However the first negative-going transition 82 of the first ramp 81 is reflected as the negative-going portion 101 of the square wave 100, and the positive-going or reset portion 94 of the second ramp signal 93 appears as the portion 102 of the resultant square wave. Inspection also shows this resultant square wave 100 is a mirror image of the square wave signal 63 produced by phase detector 60. Accordingly signal 63 is passed over lines 109, 108 and resistor 99 to the msb connection of dac 72, where it is added to the first ramp signal 81. The effect of this addition is to displace the first ramp signal 81 by 180°, and thus the resultant signal which appears at summation point 80 will be a virtually constant d-c control signal.

This d-c control signal is passed from summation point 80 through an amplifier-and-filter stage 100, which includes a local bias adjusting unit 101 for regulating the gain of an amplifier stage within circuit 100. The d-c control signal is then passed from circuit 100 over the effective portion of a variable resistor 102 to line 44. Adjustment of the system gain unit 102 regulates the loop gain in the feed-back system over line 44 to slave vco 42. The d-c control signal on line 45 is mixed with the d-c control signal received over line 44 within slave vco by any conventional mixing circuit (not shown). This circuit can be a pair of equal-value resistors connected in the mixing arrangement in much the same way resistors 77, 98 are tied to a common summation point 80. In effect the first d-c signal from speed control pot 28 applied over line 45 insures that slave vco 42 produces timing pulses which will maintain slave motor 33 in precise synchronization with the master motor 22. The d-c control signal passed from summation point 80 over line 44 to the other input connection of slave vco 42 is exactly the same d-c level as that received over line 45 when the system is operating in synchronization.

In accordance with an important aspect of this invention, the movable arm of position control unit 55 can be displaced to effect a slight position change of auxiliary conveyor 30 relative to the reference position of master conveyor 20. Normally the movable arm of potentiometer 55 would be set in the mid-range position so that the voltage signal passed over line 54 and third mixing resistor 103 to summation point 80 is exactly the same d-c voltage as would appear at point 80 from normal system operation with synchronization between the motors. The value of mixing resistor 103 is small, preferably at least an order of magnitude smaller, than the values of the mixing resistors 77 and 98. Thus a change in the potential at the movable tap of position control pot 55 in effect swamps out the normal d-c control signal provided over the summing amplifiers. This produces a modified d-c signal at summation point 80, which signal is passed over the feedback loop and line 44 to the slave vco. The result of this a-c voltage change is to produce a slight phase unbalance of the system which in turn results in a corresponding incremental physical change in the position of slave motor 33 and thus of auxiliary conveyor belt 30. Following adjustment of slave position pot 55, the phase detector and dac signals will automatically readjust such that the summed signal level at point 80 is identical to the level which existed before the adjustment was made.

One way of viewing this controlled phase displacement to produce a position change is to consider two cars moving in the same direction and at precisely the same speed on a highway. If both cars are travelling at 60 mph, they are always maintained at precisely the same relative positions. Suppose the driver of the trailing car desires to maintain the same speed, but also wants to pass the leading car. To do this he accelerates for a brief time to move out and pass the lead car, and then pulls back into the lane to become the lead car at exactly the same speed as the car he just passed. Once again there is a steady relationship in the relative positions of the two cars. This analogy is not perfect, but it conveys somewhat of the operation in which the slave conveyor can be adjusted in position relative to the main conveyor, to obtain precise alignment of the complete system.

The effect on the system of FIG. 2 of adjusting the tap of position control pot 55 is shown in FIG. 3G. The normal phase detector output signal 63 is there shown on a scale expanded relative to that of FIG. 3C. By modifying the resultant d-c voltage at summation point 80, the trailing or negative-going portion 65 of the waveform can be displaced approximately plus or minus 25 percent to produce a corresponding linear adjustment range of the auxiliary conveyor belt. The trailing edge 65 can be "moved" to the left, to the position referenced 104, or the pulse width can be extended and edge 65 moved to the right to the point referenced 105. The phase adjustment thus afforded represents an important motor control system improvement which is achieved by this invention. However the enhanced operating accuracy, or maintaining precise synchronization as achieved by the inventive system, is of great import even without any position control adjustment.

By way of example, the phaselock position control subsystem can be utilized to regulate induction motors. Position accuracy of such a system is less than that achieved with synchronous motors, because with an induction motor the slip varies with the load and thus degrades the resultant accuracy. However for those systems with a relatively constant load, or those which are load cycled at the same rate as the job space (magnetic marker intervals), system accuracy can be provided within 1 percent. The effects of variation in load in a system utilizing induction motors are shown in FIGS. 3H, 3I and 3J. The normal in-sync condition with a resultant waveform 63 is repeated in FIG. 3H. With a 100 percent load on the slave motor only, the phase detector output signal would be modified approximately to that depicted as signal 106 in FIG. 3I. A 50 percent load would modify the phase detector output signal to produce that identified as 107 in FIG. 3J. Even with these slight changes the synchronization of the two induction motors is maintained with the system shown in FIG. 2. Slave vco 42 operates at a higher frequency than does master vco 26, thus compensating for the slip rpm inherent in the induction motor.

Another important component of the invention is the out-of-sync circuit 110 shown in FIG. 2. Circuit 110 receives a first signal from the phase detector 60 over line 111, in effect "telling" the out-of-sync circuit 110 whether the system is in phase or out of phase at a given moment. This phase condition is readily determined by a simple circuit within phase detector 60, which compares receipt of the reference marker pulses 61 with receipt of the slave marker pulses 62. As long as these pulses are received alternately, it is manifest that the system is operating in sync; this is indicated by a logic signal passed over line 111 to out-of-sync circuit 110. The sense of this logic signal is reversed if two reference marker pulses 61 are received without the intervening receipt of a slave marker pulse 62, or if two marker pulses 62 are received without receiving any reference marker 61. The other logic signal applied over lines 109 and 112 indicates whether the system is under or over speed when an out-of-phase condition exists. This is also simply determined in the phase detector. If two reference pulses 61 are received before one slave pulse 62, then the system is under speed, and a first logic signal is provided over conductors 109, 112. However if two slave pulses 62 are received before a single reference marker 61, then the system is over speed, and the opposite sense of logic signal is provided over conductors 109 and 112 to out-of-sync circuit 110. The details and operational description of circuit 110 will be given hereafter in connection with FIG. 5. For the present it is sufficient to note that whenever the system is out-of-phase, an appropriate correcting signal is passed from out-of-sync circuit 110 over line 113 and a fourth mixing resistor 114 to summation point 80. Like the third mixing resistor 103, the value of the fourth mixing resistor 114 is small with respect to the values of the first two mixing resistors 77 and 98. Accordingly any correction signal provided by the out-of-sync circuit also swamps the normal d-c control signal at summation point 80, providing a modified d-c signal which is passed over circuit 100, system gain pot 102 and conductor 44 to the other input connection of slave vco 42. This signal is in a direction to correct the operation of the system by changing the frequency of the timing pulses issued from slave vco 42 over line 53 to the count-down register 84.

PHASE DETECTOR CIRCUIT 60

Integrated circuits (IC's) are now available to supply the functions of phase detector 60. One such IC is the Motorola MC4044. The interconnection and operation of such phase detectors will be understood by those skilled in this art.

REGISTERS-AND-DACS: FIG. 4

Figure 4:
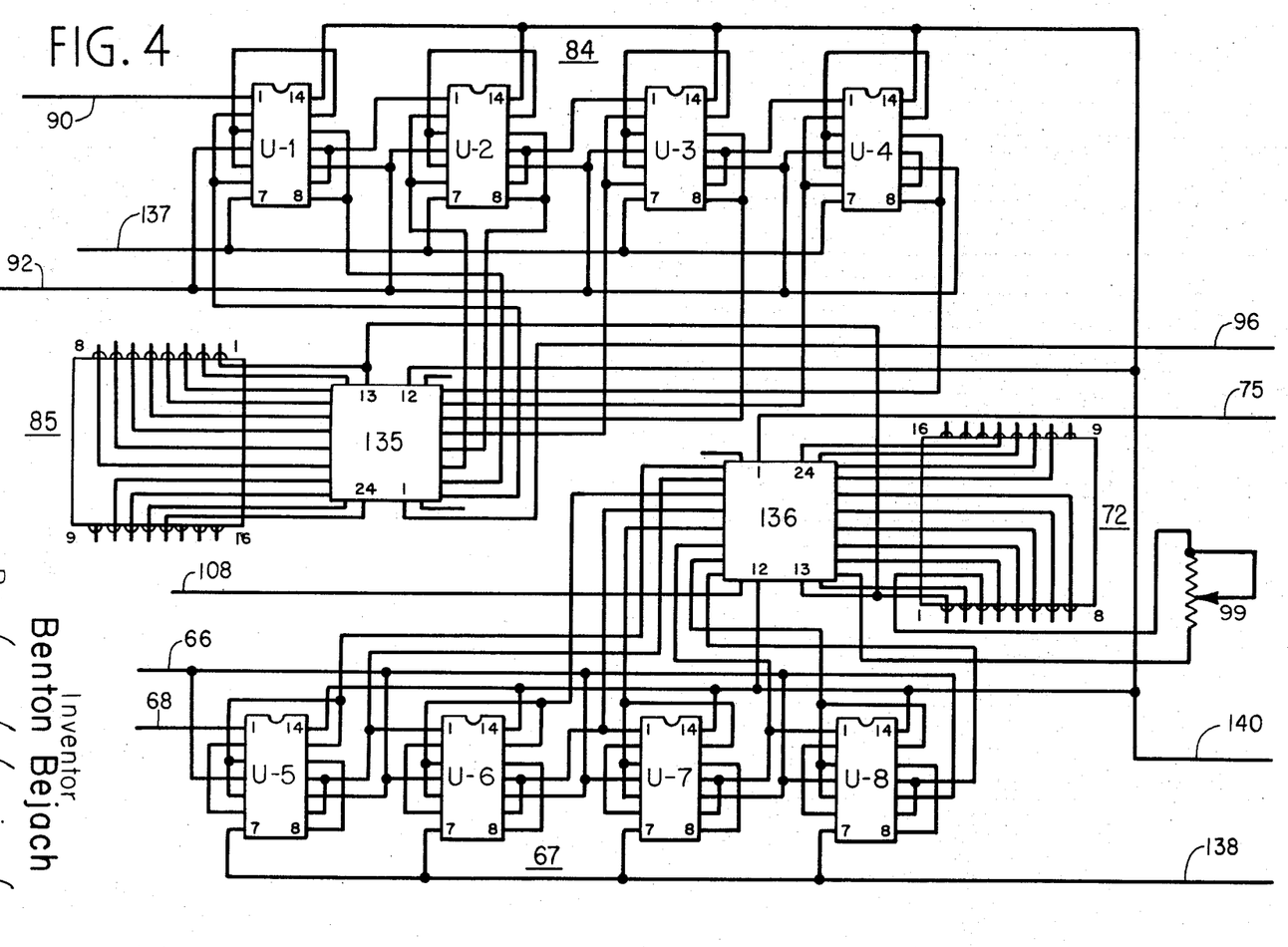
FIGS. 4 and 5 are schematic diagrams illustrating circuit details of the system shown more generally in FIG. 2.

FIG. 4 illustrates the provision and interconnection of a plurality of integrated circuits to form the count-up and count-down registers and their associated dacs. The modules designated U-1 through U-8 can be Fairchild 9093 modules, each of which comprises two flip-flops. Those skilled in the art will appreciate that other logic circuits can be substituted, to provide a divide-by-four function in each of the modules. The pin connections from 1 through 14 are shown in sequence around each of the modules U-1 through U-8. In addition, pins 1, 7, 8 and 14 are identified to assist those skilled in this art to interconnect and operate this invention. The two modules designated 135 and 136 represent current sources, each individually coupled between its associated register and dac. These units can be Fairchild 722 type sources or other suitable units. The pin connections are also indicated in sequence, with numbers 1, 12, 13 and 24 being inserted to assist those skilled in the art to make the interconnections most expeditiously. The dacs 72 and 85 can be resistive lattice networks, for example, of the MEPCO type MC400-14. The 1, 8, 9 and 16 pins are identified in these networks to depict their intercoupling with the associated current source and register.

Line 137 receives a plus 6 volt potential, as does line 138, at the bottom of FIG. 4, applying this potential to the 7 pin of each of the modules in the registers. A voltage of plus 11 volts is applied over conductor 140. With this arrangement the required count-up ramp signal is provided on line 75, and the second or count-down ramp signal on line 96, as described previously in connection with FIG. 2.

Figure 5:
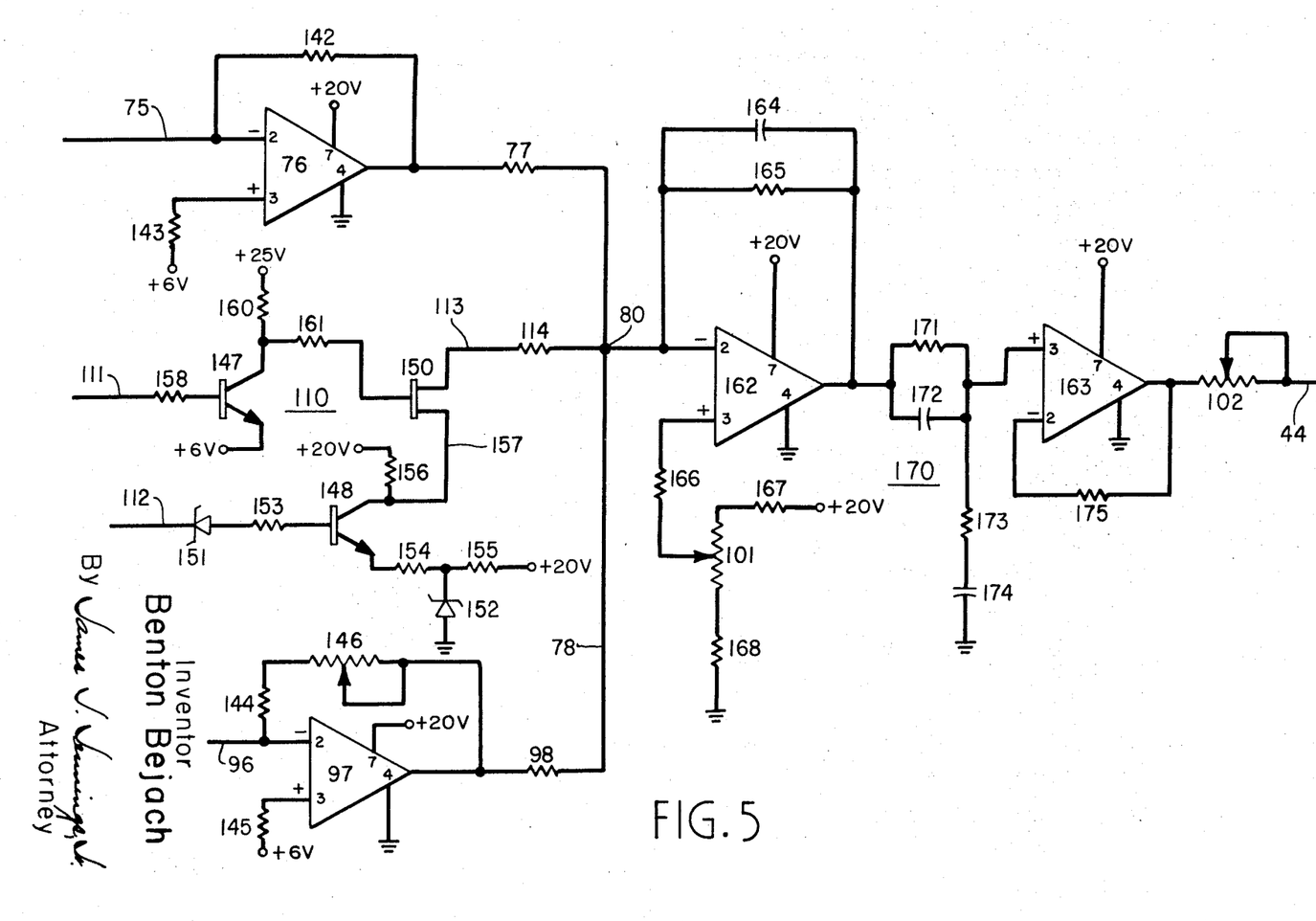

OUT-OF-SYNC CIRCUIT, SUMMING AMPLIFIERS, AND AMPLIFIER-AND-FILTER CIRCUIT: FIG. 5.

In FIG. 5 the legends for the appropriate energizing voltage levels are shown adjacent the terminal connections in the different stages. This is especially helpful in understanding the operation of out-of-sync circuit 110. The summing amplifiers 76 and 97 are illustrated with their appropriate pin connections, referring to Fairchild op amps of the 741 type. In the circuit of first summing amplifier 76, a resistor 142 is coupled between the output connection and input connection 2. Another resistor 143 is coupled between the other input terminal 3 and a terminal to which a plus 6 volt potential is applied. In the second summing amplifier stage, resistors 144 and 145 are similarly connected. In addition, a variable resistor 146 is coupled between resistor 144 and the output connection of summing amplifier 97 to provide gain adjustment. The adjustment trims the gain of amplifier 97, such that under normal conditions the sloping portions 83 and 95 of waveforms 81 and 93 are identical in slope. This is required because even precision dac's are not matched to one another. These stages provide a d-c control signal at summation point 80 as previously described.

Considering now the out-of-sync circuit 110, a pair of NPN type transistors 147 and 148 are connected in the circuit, together with a field-effect transistor (FET) 150. Zener diodes 151 and 152 are also coupled in this circuit as shown.

For purposes of this explanation, it is assumed that a logical 1 signal is a positive signal, of a level sufficient to rapidly drive on transistors 147 and 148. When this entire system is operating normally and the desired synchronized relationship is maintained between the master and slave motors, then the signals on lines 111, 112 are logical zeros and circuit 110 does not operate to modify the d-c control signal at summation point 80.

Considering first the start-up condition of the system, this is similar to an underspeed condition, where "underspeed" signifies that the slave motor is operating at a speed under that indicated by the setting of speed control pot 28. In this underspeed condition, two reference or master pulses arrive over line 46 at phase detector 60 without the intervening receipt of a slave marker pulse over line 51. This produces a logical 1, or positive, signal at the output side of phase detector 60. This signal is passed over lines 109 and 112, Zener diode 151 and resistor 153 to the base of transistor 148, rapidly saturating this transistor. The emitter of transistor 148 is coupled over a series circuit including resistors 154 and 155 to an energizing terminal, and its collector is coupled over another resistor 156 to another energizing terminal. A plus 20 volts potential is applied to both these terminals. With this rapid saturation of transistor 148, the potential at its collector goes negative and this negative-going signal is applied over line 157 to the drain of FET 150.

Receipt of the two successive master marker pulses at phase detector 60 without any receipt of a slave marker signal also causes a positive or logical 1 signal to appear at the output terminal coupled to conductor 111. This signal is applied over line 111 and resistor 158 to the base of transistor 147, and rapidly saturates this transistor. The collector of transistor 147 is coupled over resistor 160 to an energizing terminal which receives a plus 25 volt potential, and the collector is also coupled over a resistor 161 to the gate of FET 150. When transistor 147 was still non-conducting, a positive potential was applied over resistors 160 and 161 as a pinch-off voltage for FET 150. When the logical one signal is received over line 111 and transistor 147 is saturated, the potential at its collector rapidly goes negative and thus the pinch-off voltage is removed from the gate of FET 150. Accordingly the negative-going signal on line 157 which is appearing on the drain of FET 150 now appears on its source. This negative-going signal is passed over line 113 and mixing resistor 114 to summation point 80. Like mixing resistor 103, the resistance value of mixing resistor 114 is small, preferably at least an order of magnitude smaller, than the values of the first and second mixing resistors 77 and 98. Accordingly the d-c control signal at summation point 80 which would otherwise be passed to the slave vco 42 to regulate its speed is swamped out by the negative-going signal received over mixing resistor 114 from the out-of-sync circuit. As will be explained hereinafter, a negative-going signal at point 80 is inverted in circuit 100, and a positive-going signal is applied to slave vco 42. The effect of this positive change in the level of the modified d-c voltage applied over line 44 to slave vco 42 is to increase the frequency of the pulses applied over line 41 to slave inverter 35, to correct the underspeed condition.

Operation to correct an overspeed condition, which also occurs when the system is being shut down, is related to that just described. In the overspeed condition there is also an out-of-sync signal, or a logical 1, applied over line 111 to saturate transistor 147 and remove the pinch-off voltage from FET 150. In the overspeed mode, two slave marker pulses arrive at phase detector 60 without the intervening receipt of a master pulse. This produces a logical zero or negative signal on lines 109 and 112, and transistor 148 remains non-conducting. The positive signal at the top of resistor 156 is thus applied over line 157 to the drain of FET 150, and is passed to its source, over line 113 and mixing resistor 114 to summation point 80. Ultimately this positive-going signal is inverted to a negative change on line 43, and has the opposite effect of that just described. The result is a reduction in the frequency of the vco pulses applied over line 41 to the slave inverter 35.

Within amplifier-and-filter circuit 100 a pair of op amps 162 and 163 are illustrated. These can be Fairchild 741 units, like the summing amplifiers 76 and 97. In the first amplifier stage the negative or 2 pin is connected to summation point 80, and also to one side of a parallel circuit including a capacitor 164 and a resistor 165. The other side of this parallel circuit is coupled to the output side of amplifier 162. The other input connection of this amplifier is coupled over resistor 166 to the movable tap of a local bias adjust potentiometer 101, which is coupled in a voltage divider circuit between resistors 167 and 168.

Between the output side of amplifier 162 and the 3 pin of amplifier 163 is a filter circuit 170. The filter circuit includes a parallel-connected portion, having a resistor 171 and a capacitor 172, in the signal path. Between this parallel-connected circuit and ground is a series circuit including a resistor 173 and a capacitor 174. Suitable values for these components and the other circuit components depicted in FIG. 5 will be given below to simplify practice of the invention.

A feedback resistor 175 is coupled between the output side of op amp 163 and the 2 pin at its input side. System gain control 102 is shown as a variable resistor coupled between op amp 163 and the conductor 44 which passes the d-c regulating signal to one input connection of slave vco 42. The system gain can be regulated either by adjustment of system gain pot 102 or of the local bias adjust unit 101.

To illustrate the operation, in the overspeed condition a positive-going signal is applied from FET 150 to summation point 80, and thus to op amp 162. This signal is inverted in stage 162 and a negative-going signal appears at its output, which is passed over filter 170 to the 3 pin of op amp 163. There is no inversion in stage 163, and thus a negative-going signal is passed over line 44 to slave vco 42. This negative-going signal "slows down" vco 42, or reduces the frequency of the timing pulses passed over line 41 to the slave inverter 35.

In out-of-sync circuit 110, Zener diode 151 was a 1N706A, and 152 was a 1N747 type. The energizing voltages are shown on the schematic, and the values of the capacitors in microfarads and the resistors in ohms are set out below.

| | |
|---|---|
| 164–0.01 | 154–1.8K |
| 172–0.33 | 155–1.6K |
| 174–2.2 | 156,160– 10K |
| 77,98– 51K | 158– 47K |
| 101,143,145– 2K | 161–100K |
| 102– 150K | 165–220K |
| 114–7.5 K | 166– 33K |
| 142–2.4 K | 167,168–3.9K |
| 144–2.2 K | 171–200K |
| 146–500 | 173– 24K |
| 153– 16K | 175– 20K |

It is understood that these are typical operating values to enable one skilled in this art to implement the invention with a minimum of experimentation. In no sense are these values, or the previous identification of integrated circuits and other components, a limitation on the basic concept and system configurations of this invention.

SUMMARY

The present invention provides a high degree of accuracy in a system for synchronizing the rotation of two or more a-c motors. It is again emphasized that this system, with or without a position control unit such as potentiometer 55, has utility with induction motors. For greater accuracy synchronous motors can be employed. In the systems which use synchronous motors, measuring accuracy (relative to the driving motors or to the driven loads) has been as low as one-fourth of 1 percent of one job space. With adjustment of position control unit 55, a range of adjustment of plus or minus 40 percent of a job space is readily obtainable, to afford precise operation of the slave motor or driven load relative to the master reference, whether a master conveyor belt or the master motor. Overall system accuracy of 1 percent of a job space or work position interval has been achieved.

While only a particular embodiment of the invention has been described and illustrated, it will be understood that various modifications and alternations may be made therein. It is therefore the intention in the appended claims to cover all such modifications and alterations as may fall within the true spirit and scope of the invention.

What is claimed is:

1. A variable speed motor control system for driving a first a-c motor energized from a first inverter which receives timing pulses from a master source, including a system speed control unit connected to regulate the rate at which the timing pulses issue from the master source, a second a-c motor energized from a second inverter which receives timing pulses from a slave source, and the improvement which comprises a phaselock and position control subsystem, including:

means for applying a signal from the system speed control unit to the slave source of timing pulses,
a phase detector, connected to receive a first series of position-indicating signals which varies as a function of move-ment of the first a-c motor and to provide a first reset signal upon receipt of each position-indicating signal in the first series, and also connected to receive a second series of position-indicating signals which varies as a function of movement of the second a-c motor and to provide a second reset signal upon receipt of each position-indicating signal in the second series,
a first register-and-dac, connected to receive an input signal from the master source and to provide a first ramp signal with a slope of given polarity, and also coupled to said phase detector so that the reset portion of the first ramp signal is determined by said first reset signal,
a second register-and-dac, connected to receive an input signal from the slave source and to provide a second ramp signal with a slope having a polarity opposite that of the first ramp signal and displaced in phase relative to the first ramp signal, and also coupled to said phase detector so that the reset portion of the second ramp signal is determined by said second reset signal,
summing means for combining the ramp signals to provide a d-c control signal at a summation point, and
means for applying the d-c control signal to the slave source of timing pulses, to maintain synchronized operation between the first and second a-c motors.

2. A variable speed motor control system as claimed in claim 1, in which the subsystem further comprises a position control unit, coupled to the summing means, such that adjustment of the position control unit modifies the d-c control signal and produces an incremental position displacement of the second a-c motor with respect to the first a-c motor, without disturbing the synchronized operation between the two motors.

3. A variable speed motor control system as claimed in claim 1, in which the summing means comprises first and second summing amplifiers respectively coupled to the dacs, and a pair of mixing resistors, each coupled between the summation point and one of the summing amplifiers, such that the d-c control signal is provided at the summation point for application to the slave source of timing pulses.

4. A variable speed motor control system as claimed in claim 1, in which the subsystem further comprises an out-of-sync circuit connected to receive both a first signal from the phase detector indicating in-phase and out-of-phase operation, and a second signal from the phase detector indicating under-speed and over-speed conditions when the system is out-of-phase, and means coupled between the out-of-sync circuit and the summing means, to override the d-c control signal when the system is out of phase and pass to the slave source a modified d-c signal to drive the system toward in-phase operation.

5. A variable speed motor control system as claimed in claim 1, in which the subsystem further comprises an amplifier-and-filter circuit, coupled between the summing means and the slave source of timing pulses, including means for adjusting the gain of the system and thus ad-justing variations in the duty cycle of the phase detector to maintain system accuracy.

6. A variable speed motor control system for driving a master a-c motor energized from a master inverter which receives timing pulses from a master vco, including a system speed control unit connected to regulate the rate at which the timing pulses issue from the master vco, and a slave a-c motor energized from a slave inverter which receives timing pulses from a slave vco, characterized by a phaselock and position control subsystem which includes:

means for applying a signal from the system speed control unit to the slave vco,
a phase detector, connected to receive a first series of low frequency position indicating signals which varies as a function of movement of the master a-c motor and to provide a first reset signal upon receipt of each position indicating signal in the first series, also connected to receive a second series of low frequency position indicating signals which varies as a function of movement of the slave a-c motor and to provide a second reset signal upon receipt of each position indicating signal in the second series, and also connected to provide a square wave output signal in which the positive-going and negative-going portions are determined by the first and second series of low frequency position indicating signals,
a count-up register-and-dac, connected to receive a high frequency input signal from the master vco and to provide a first ramp signal with a positive slope, and also coupled to the phase detector so that the reset portion of the first ramp signal is determined by receipt of said first reset signal,
a count-down register-and-dac, connected to receive a high frequency input signal from the slave vco and to provide a second ramp signal with a negative slope, which second ramp signal is displaced in phase with respect to the first ramp signal, and also coupled to the phase detector so that the reset portion of the second ramp signal is determined by receipt of said second reset signal,
summing means for combining the positive-slope and negative which the timing pulses issue from the master vco, and a slave a-c motor energized from a slave inverter which receives timing pulses from a slave vco, characterized by a phaselock and position control subsystem which includes:
means for applying a signal from the system speed control unit to the slave vco,
a phase detector, connected to receive a first series of low frequency position indicating signals which varies as a function of movement of the master a-c motor and to provide a first reset signal upon receipt of each position indicating signal in the first series, also connected to receive a second series of low frequency position indicating signals which varies as a function of movement of the slave arc motor and to provide a second reset signal upon receipt of each position indicating signal in the second series, and also connected to provide a square wave output signal in which the positive-going and negative-going portions are determined by the first and second series of low frequency position indicating signals, a count-up register-and-dac, connected to receive a high frequency input signal from the master vco and to provide a first ramp signal with a positive slope, and also coupled to the phase detector so that the reset portion of the first ramp sig-nal is determined by receipt of said first reset signal, a count-down register-and-dac, connected to receive a high frequency input signal from the slave vco and to provide a second ramp signal with a negative slope, which second ramp signal is displaced in phase with respect to the first ramp signal, and also coupled to the phase detector so that the reset portion of the second ramp signal is determined by receipt of said second reset signal, summing means for combining the positive-slope and negative-slope ramp signals with the phase detector square wave output signal to provide a d-c control signal at a summation point, and means for applying the d-c control signal to the slave vco, to maintain synchronized operation between the master and slave a-c motors.

7. A variable speed motor control system as claimed in claim 6, in which the subsystem further comprises a position control unit with a voltage-adjusting portion coupled to the summing means, such that movement of the voltage-adjusting portion modifies the d-c control signal at the summation point so that a modified d-c signal is applied to the slave vco, thus producing an incremental position displacement of the slave motor relative to the master motor without changing the synchronized operation of the two motors.

8. A variable speed motor control system as claimed in claim 6, in which the summing means includes first and second summing amplifiers individually coupled to the dacs, and a pair of mixing resistors of given value, each resistor coupled between the summation point and one of the summing amplifiers, such that the d-c control signal is provided at the summation point by combining the output signals from the summing amplifiers over the mixing resistors.

9. A variable speed motor control system as claimed in claim 8, in which the subsystem further comprises an out-of-sync circuit, a third resistor coupled between the out-of-sync circuit and the summation point, which third resistor has a value approximately an order of magnitude less than said given value, so that application of an override signal from the out-of-sync circuit swamps the d-c control signal at the summation point, thus driving the slave vco in the proper direction to achieve synchronized operation.

10. A variable speed motor control system as claimed in claim 9, in which the out-of-sync circuit is connected to receive a first input signal from the phase detector connoting in-phase and out-of-phase operation, and is also connected to receive a second input signal from the phase detector connoting underspeed and overspeed conditions.

11. A variable speed motor control system as claimed in claim 6, in which the means for applying the d-c control signal to the slave vco includes an amplifier-and-filter circuit having at least one amplifier stage, and having a variable resistor connected to adjust the system gain.

12. A variable speed motor control system as claimed in claim 11, in which the variable resistor is coupled in series with the main signal path through amplifier-and-filter circuit to adjust the system gain.

13. A variable speed motor control system for driving a first a-c motor energized from a first inverter which receives timing pulses from a master source, including a system speed control unit connected to regulate the rate at which the timing pulses issue from the master source, a second a-c motor energized from a second inverter which receives timing pulses from a slave source, and the improvement which comprises a phaselock and position control subsystem including:

means for applying a signal from the system speed control unit to the slave source of timing pulses, a phase detector, connected to receive a first series of position-indicating signals which varies as a function of move-ment of the first a-c motor and to provide a first reset signal upon receipt of each position-indicating signal in the first series, also connected to receive a second series of position-indicating signals which varies as a function of movement of the second a-c motor and to provide a second reset signal upon receipt of each position-indicating signal in the second series, and to provide a square wave output signal in which the positive-going and negative-going portions are determined by the first and second series of position-indicating signals;

a first function generator, connected to receive an input signal from the master source and to provide a first a-c signal with different parameters, in which one parameter is determined by receipt of said first reset signal from the phase detector, a second function generator, connected to receive an input signal from the slave source and to provide a second a-c signal with different parameters, one parameter having a polarity opposite that of the corresponding parameter in the first a-c signal and displaced in phase relative to the first a-c signal, in which another parameter of the second ramp signal is deter-mined by receipt of said second reset signal from the phase detector, summing means for combining the a-c signals with the square wave output signal of the phase detector to provide a d-c control signal at a summation point, which d-c control signal has virtually zero ripple voltage at the low-frequency rate of the position-indicating signals, and means for applying the d-c control signal to the slave source of timing pulses, to maintain synchronized operation between the first and second a-c motors.

\* \* \* \* \*

UNITED STATES PATENT OFFICE
CERTIFICATE OF CORRECTION

Patent No. 3,718,846     Dated February 27, 1973

Inventor(s) Benton Bejach

It is certified that error appears in the above-identified patent and that said Letters Patent are hereby corrected as shown below:

Column 2, line 22, "syn-chronized" should read -- synchronized --;

Column 4, line 60, "in-dicating" should read -- indicating --;

Column 5, line 23, "sig-nal" should read -- signal --;
line 32, "about" should read -- above --;

Column 8, line 41, "out of-sync" should read -- out-of-sync --;

Column 13, line 14, "move-ment" should read -- movement --;

Column 14, line 9, "ad-justing" should read -- adjusting --; line 53 up to and including line 22 in column 15 should be cancelled;

Column 16, line 27, "move-ment" should read -- movement --; line 51, "deter-mined" should read -- determined --.

Signed and sealed this 26th day of February 1974.

(SEAL)
Attest:

EDWARD M. FLETCHER, JR.      C. MARSHALL DANN
Attesting Officer            Commissioner of Patents